United States Patent
Na et al.

(10) Patent No.: US 10,608,263 B2
(45) Date of Patent: Mar. 31, 2020

(54) COOLANT BYPASS STRUCTURE

(71) Applicants: HYUNDAI MOTOR COMPANY, Seoul (KR); KIA MOTORS CORPORATION, Seoul (KR)

(72) Inventors: Sung Wook Na, Yongin-si (KR); Sun Heum Baek, Yongin-si (KR); Hyung Kook Kim, Seongnam-si (KR); Hun Woo Park, Namyangju-si (KR); Dae Jong Kim, Yongin-si (KR); Su Dong Han, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1030 days.

(21) Appl. No.: 14/854,816

(22) Filed: Sep. 15, 2015

(65) Prior Publication Data
US 2016/0164117 A1    Jun. 9, 2016

(30) Foreign Application Priority Data

Dec. 8, 2014 (KR) .......................... 10-2014-0175084

(51) Int. Cl.
*H01M 8/04* (2016.01)
*H01M 8/04029* (2016.01)
(Continued)

(52) U.S. Cl.
CPC ......... *H01M 8/04029* (2013.01); *B60L 58/33* (2019.02); *B60L 58/34* (2019.02); *H01M 8/0435* (2013.01); *H01M 8/04768* (2013.01); *B60L 2240/34* (2013.01); *B60L 2240/662* (2013.01); *H01M 2250/20* (2013.01);
(Continued)

(58) Field of Classification Search
CPC ......... H01M 8/04029; H01M 8/04723; H01M 8/04768; H01M 8/043658; H01M 8/0435
See application file for complete search history.

(56) References Cited

U.S. PATENT DOCUMENTS 9,067,476 B2 * 6/2015 Park ................... B60H 1/00385
9,640,809 B2 * 5/2017 Na ..................... H01M 8/04074
(Continued)

FOREIGN PATENT DOCUMENTS

JP    2007-294305 A    11/2007
KR    10-0792895 B1    1/2008
(Continued)

OTHER PUBLICATIONS

Kim et al. KR1020120062378 machine translation, Obtained form espacenet.com (Year: 2012).*

*Primary Examiner* — Muhammad S Siddiquee
(74) *Attorney, Agent, or Firm* — Morgan, Lewis & Bockius LLP

(57) ABSTRACT

A coolant bypass structure includes a main loop forming a channel in which coolant circulates; a bypass loop connected to the main loop and forming a selective bypass channel; and a stack bypass valve provided between the main loop and the bypass loop to open and close the bypass loop according to a predetermined temperature, and provided with an outlet temperature sensor. The coolant bypass structure may improve marketability by decreasing the starting time of the fuel cell vehicle in a frozen state and improve power efficiency.

8 Claims, 6 Drawing Sheets

(51) Int. Cl.
    *H01M 8/0432* (2016.01)
    *H01M 8/04746* (2016.01)
    *B60L 58/34* (2019.01)
    *B60L 58/33* (2019.01)

(52) U.S. Cl.
    CPC ............ *Y02T 10/7291* (2013.01); *Y02T 90/16* (2013.01); *Y02T 90/32* (2013.01); *Y02T 90/34* (2013.01)

(56) References Cited

U.S. PATENT DOCUMENTS

| | | | |
|---|---|---|---|
| 9,944,152 B2* | 4/2018 | Kim | B60H 1/00428 |
| 2003/0031905 A1* | 2/2003 | Saito | H01M 8/04007 |
| | | | 429/429 |
| 2006/0147772 A1 | 7/2006 | Takemoto | |
| 2009/0140066 A1* | 6/2009 | Han | B60L 1/02 |
| | | | 237/12.3 R |

FOREIGN PATENT DOCUMENTS

| | | |
|---|---|---|
| KR | 10-2012-0062378 A | 6/2012 |
| KR | 10-1240974 B1 | 3/2013 |

\* cited by examiner

COOLANT BYPASS STRUCTURE

CROSS-REFERENCE TO RELATED APPLICATION

This application is based on and claims the benefit of priority to Korean Patent Application No. 10-2014-0175084, filed on Dec. 8, 2014 in the Korean Intellectual Property Office, the disclosure of which is incorporated herein in its entirety by reference.

TECHNICAL FIELD

The present disclosure relates to a coolant bypass structure, and more particularly, to a coolant bypass structure capable of improving starting efficiency of a fuel cell vehicle in a frozen state.

BACKGROUND

In general, a fuel cell system applied to a hydrogen fuel cell vehicle, which is a one of eco-friendly vehicles of the future is configured to include a fuel cell stack generating electric energy from an electrochemical reaction of reaction gas, a hydrogen supply device supplying hydrogen, which is fuel, to the fuel cell stack, an air supply device supplying air including oxygen, which is an oxidant required in the electrochemical reaction, to the fuel cell stack, a heat and water management system discharging heat, which is a by-product of the electrochemical reaction of the fuel cell stack, to the outside to optimally control an operation temperature of the fuel cell stack and performing a water management function.

In the configuration as described above, the fuel cell stack generates electric energy from an electrochemical reaction of hydrogen, which is the reaction gas, and oxygen in the air and discharges heat and water as by-products of the reaction. Therefore, in the fuel cell system, a cooling system cooling the stack in order to prevent a temperature of the stack from being raised is essential.

However, in a fuel cell vehicle according to the related art, starting efficiency is low in a frozen state, and thus, marketability may be deteriorated.

RELATED ART DOCUMENT

Patent Document 1: Korean Patent No. 10-1240974

SUMMARY

The present disclosure has been made to solve the above-mentioned problems occurring in the prior art while advantages achieved by the prior art are maintained intact.

An aspect of the present disclosure provides a coolant bypass structure capable of improving starting efficiency of a fuel cell vehicle particularly in a frozen state.

According to an exemplary embodiment of the present disclosure, a coolant bypass structure includes: a main loop forming a channel in which coolant circulates; a bypass loop connected to the main loop and forming a selective bypass channel; and a stack bypass valve provided between the main loop and the bypass loop to open and close the bypass loop according to a predetermined temperature, and provided with an outlet temperature sensor.

The main loop may include a 4-way valve, a pump, and a stack, wherein the stack is connected to the stack bypass valve to form a main channel.

The bypass loop may include a cathode oxygen depleted (COD) heater to form a channel different from the main channel.

The outlet temperature sensor may be linked with the stack bypass valve to control the stack bypass valve.

When an outdoor temperature or a temperature of an air outlet of the stack is equal to or lower than the predetermined temperature, the outlet temperature sensor may send a signal to open the stack bypass valve to circulate the coolant in the bypass loop, and the coolant circulated in the bypass loop may be heated by the COD heater, such that a starting time in a cold starting mode may be decreased.

When a temperature of an air outlet of the stack or the COD heater is higher than the predetermined temperature, the outlet temperature sensor may send another signal to close the stack bypass valve to circulate the coolant in the main loop, and the coolant circulated in the main loop may be introduced in the stack, such that the coolant is not heated at a normal temperature.

The bypass loop may further include an additionally provided cooling and heating air conditioner and filter, such that heating efficiency may be improved.

According to another exemplary embodiment of the present disclosure, a fuel cell system may include a fuel cell stack disposed at a main loop; a bypass loop connected to the main loop and bypassing the fuel cell stack; and a stack bypass valve guiding coolant to circulate in the main loop or in the bypass loop in accordance with a predetermined temperature.

The fuel cell system may further include a cathode oxygen depleted (COD) heater disposed at the bypass loop.

The fuel cell system may further include an outlet temperature sensor disposed adjacent to the stack bypass valve.

The stack bypass valve may guide the coolant to circulate in the main loop when a temperature detected by the outlet temperature sensor is higher than the predetermined temperature, and the stack bypass valve may guide the coolant to circulate in the bypass loop when the temperature detected by the outlet temperature sensor is equal to or lower than the predetermined temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
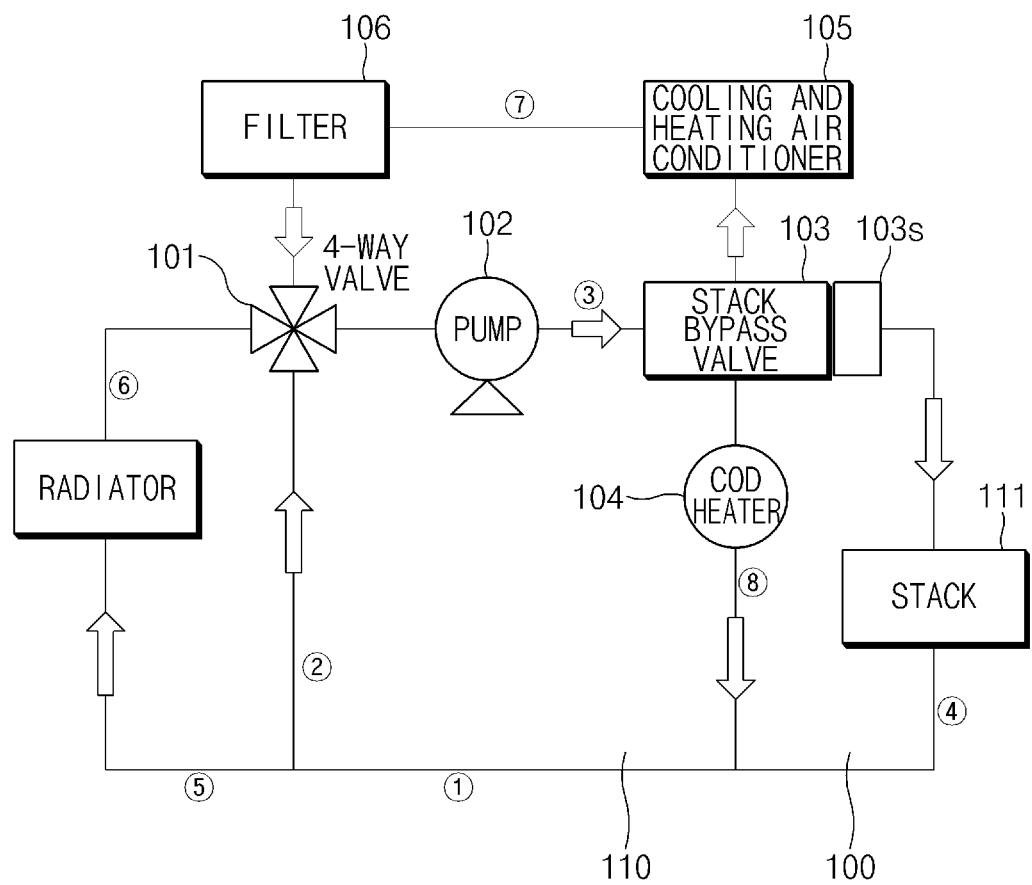
FIG. 1 is a structural view showing a coolant bypass structure according to the present disclosure.

An exemplary embodiment of the present disclosure will be described in detail with reference to the accompanying drawings.

A coolant bypass structure according to the present disclosure includes a main loop 100 in which coolant circulates, a bypass loop 110 connected to the main loop 100, and a stack bypass valve 103 opening and closing the bypass loop 110 and provided with an outlet temperature sensor 103s as shown in FIGS. 1 to 4. Reference numerals ① through ⑧ denote a circulating order of a coolant flow.

As shown in FIG. 1, the main loop 100 is a basic channel in which the coolant circulates.

Here, the main loop 100 forms a channel including a 4-way valve 101, a pump 102, and a stack 111 (for example, a fuel cell stack), and it is preferable that the stack 111 is connected to the bypass valve 103.

The bypass loop 110 is connected to a cathode oxygen depleted (COD) heater 104 to form a selective bypass channel according to a predetermined value to be described below.

The outlet temperature sensor 103s is provided between the main loop 100 and the bypass loop 110, thereby making it possible to open or close the bypass loop 110 according to the predetermined value.

Further, it is preferable that the outlet temperature sensor 103s is linked with the stack bypass valve 103 to control the stack bypass valve 103.

In this case, when an outdoor temperature or a temperature of an air outlet of the stack 111, detected by the outlet temperature sensor 103s, is equal to or lower than the predetermined value, the outlet temperature sensor 103s may send a control signal to the stack bypass valve 103 to open the stack bypass valve 103 so as to circulate the coolant in the bypass loop 110.

Here, the coolant circulated in the bypass loop 110 is heated by the COD heat 104.

Further, when a heat generation amount of the air outlet of the stack 111 or the COD heat 104 increases and the outlet temperature sensor 103s detects the temperature of the outdoor or the air outlet of the stack 111 is higher than the predetermined value, the outlet temperature sensor 103s may send another control signal to the stack bypass valve 103 to close the stack bypass valve 103 so as to circulate the coolant in the main loop 100.

In this case, the coolant circulated in the main loop 100 is introduced into the stack 111.

Figure 2:
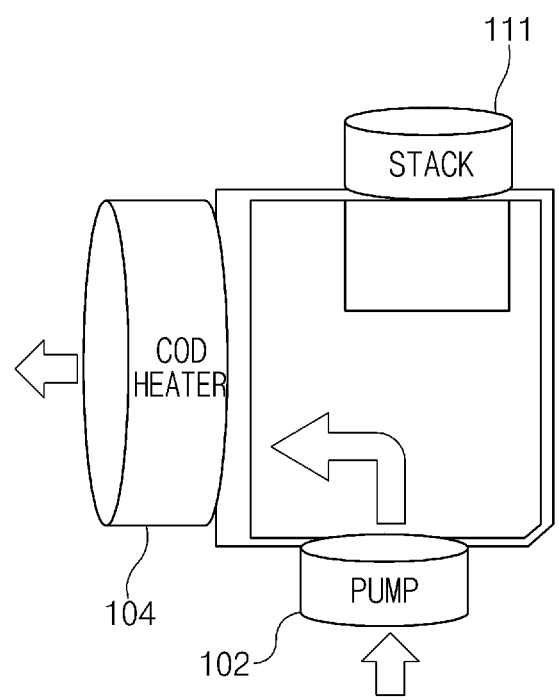
FIG. 2 is a view showing a flow of coolant in a cold starting mode in the coolant bypass structure according to the present disclosure.
Figure 4:
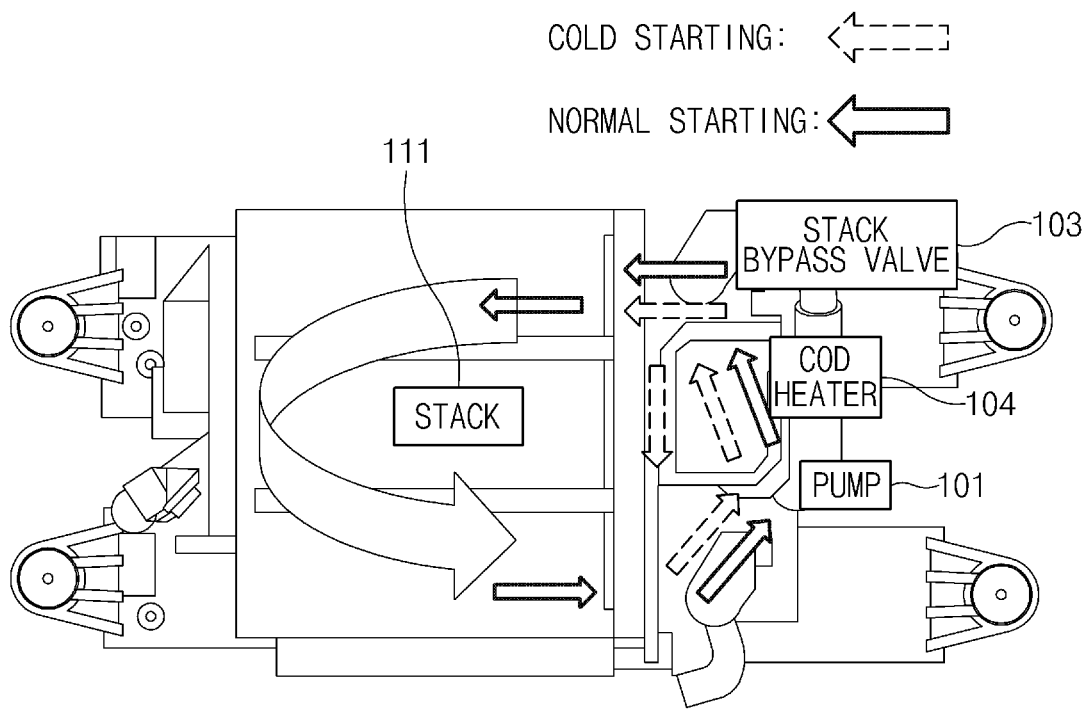
FIG. 4 is a plan view showing a flow of coolant in the TMS module to which the coolant bypass structure according to the present disclosure is applied.

That is, according to the present disclosure, the COD heat 104 may be driven, and in the case in which a vehicle is in a cold starting mode, as shown in FIGS. 2 and 4, the stack bypass valve 103 is opened to circulate the coolant only in the bypass loop 110 to block the stack 111. Therefore, even though the pump 102 is driven, the coolant is not introduced into the stack 111 of the main loop 100, and as a result, a freezing phenomenon by condensed water is not generated, and the coolant may be heated by the COD heater 104, thereby making it possible to decrease a starting time even in the cold starting mode.

Figure 3:
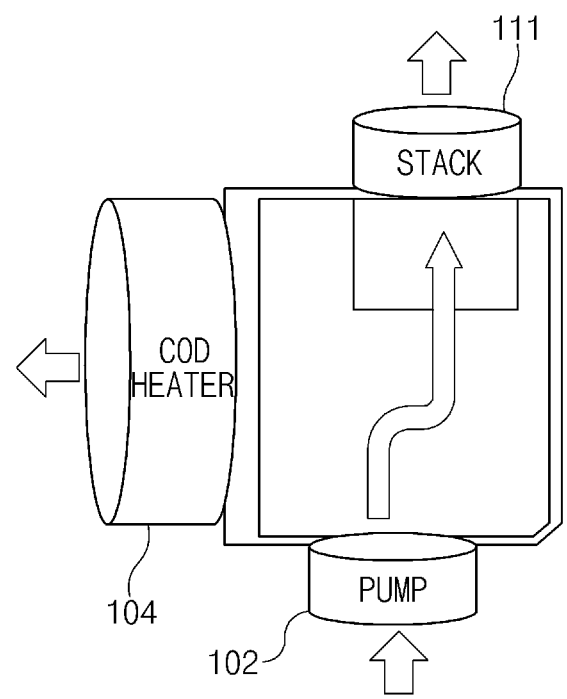
FIG. 3 is a view showing a flow of coolant in a normal starting mode in the coolant bypass structure according to the present disclosure.

Further, in a normal starting mode, as shown in FIGS. 3 and 4, the stack bypass valve 103 is closed to circulate the coolant only in the main loop 100, such that the COD heater 104 is blocked and the coolant is introduced into the stack 111, thereby making it possible to start the vehicle without heating the coolant at a normal temperature.

Meanwhile, it is preferable that the bypass loop 110 includes an additionally provided cooling and heating air conditioner 105 and filter 106.

In this case, that the cooling and heating air conditioner 105 is connected to the stack bypass valve 103, and the filter 106 is connected to the 4-way valve 101, such that at the time of circulating the coolant through the bypass loop 110, heating efficiency may be preferably improved.

In addition, it is preferable that in the bypass loop 110, the coolant is circulated along a channel passing through the pump 102 and the stack bypass valve 103 from the 4-way valve 101 to the COD heater 104.

Figure 5:
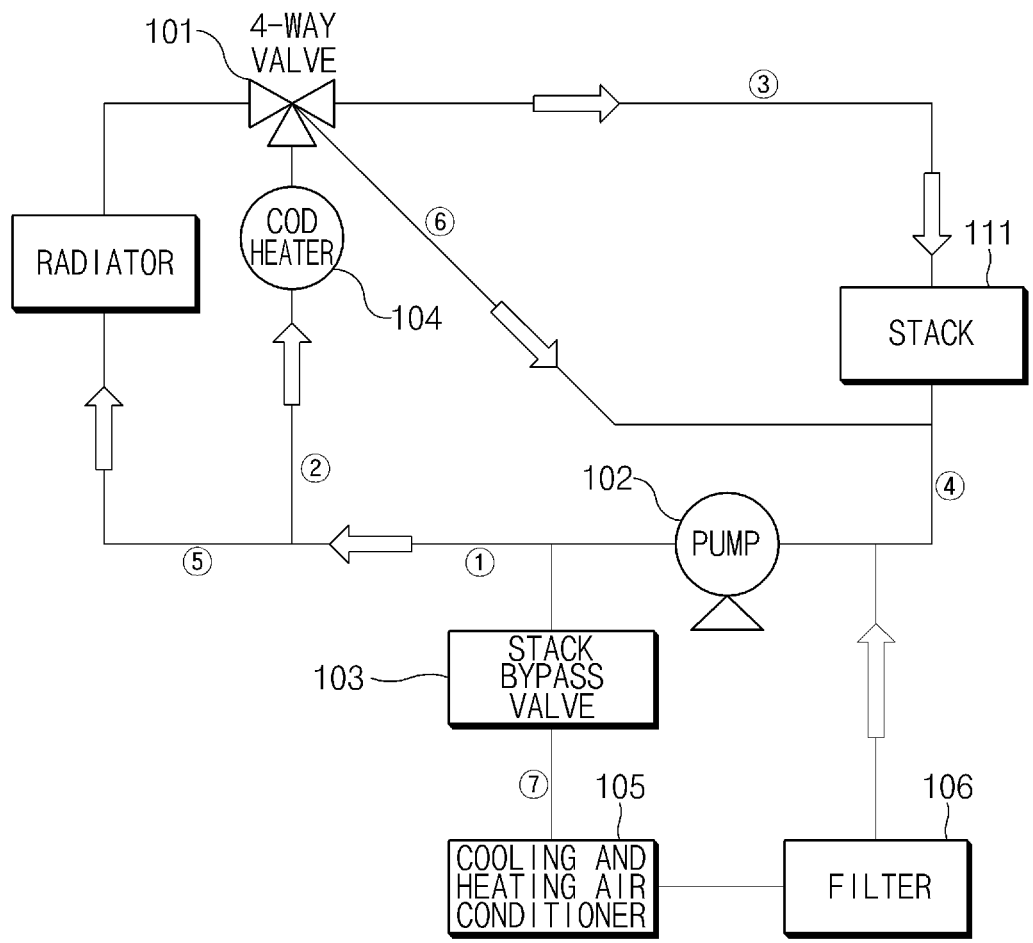
FIGS. 5 and 6 are structural views showing other examples of the coolant bypass structure according to the present disclosure.
Figure 6:
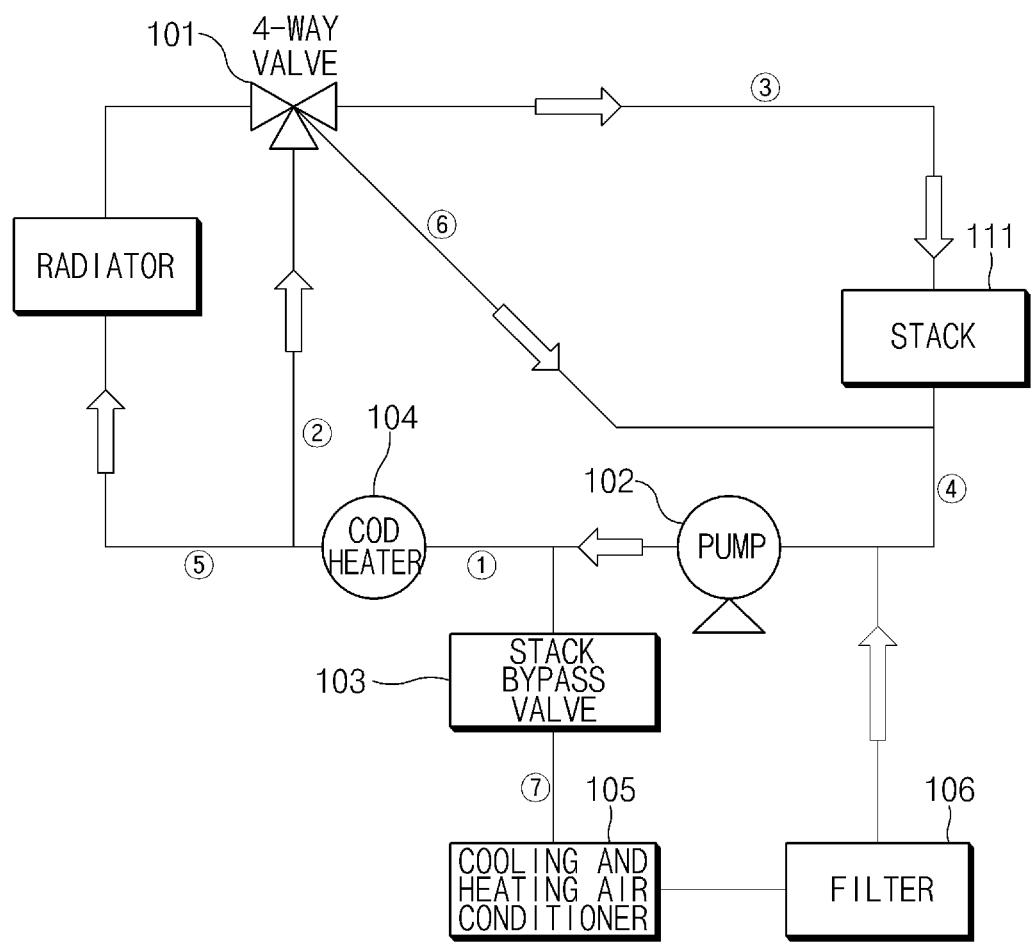

Meanwhile, according to the present disclosure, based on the main loop 100 and the bypass loop 110 as shown in FIG. 1, main loops 100 and bypass loops 110 as shown in FIGS. 5 and 6 may be formed depending on the structure and setting.

As described above, the coolant bypass structure according to the present disclosure is composed of the main loop 100 forming the channel in which the coolant circulates, the bypass loop 110 connected to the main loop 100 and forming the selective bypass channel, and the stack bypass valve 103 provided between the main loop 100 and the bypass loop to open and close the bypass loop 110 according to the predetermined value and provided with the outlet temperature sensor 103s, making it possible to improve marketability by decreasing the starting time of the fuel cell vehicle in the frozen state and improve power efficiency.

As set forth above, according to the present disclosure, the starting time of the fuel cell vehicle in the frozen state may be decreased by using the COD heater, such that marketability may be improved, and power efficiency may be improved.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the claims to be provided below and their equivalents.

What is claimed is:

1. A coolant bypass structure comprising:
   a main loop forming a channel in which coolant circulates and including a stack;
   a bypass loop connected to the main loop, forming a selective bypass channel, and including a cathode oxygen depleted (COD) heater; and
   a stack bypass valve arranged between the main loop and the bypass loop to open and close the bypass loop the stack bypass valve including an outlet temperature sensor coupled thereto,
   wherein the stack bypass valve is configured to:
      open the bypass loop and close the main loop in order for the coolant to circulate in the bypass loop and be heated by the COD heater when a temperature acquired by the outlet temperature sensor is lower than or equal to a predetermined value; and
      close the bypass loop and open the main loop in order for the coolant to circulate in the main loop when a temperature acquired by the outlet temperature sensor is higher than the predetermined value, and
   wherein the bypass loop further includes a cooling and heating air conditioner connected to the stack bypass valve, and a filter connected to the cooling and heating air conditioner and to a 4-way valve arranged between the main loop and the bypass loop.

2. The coolant bypass structure according to claim 1, wherein the main loop further includes a pump, the stack being connected to the stack bypass valve.

3. The coolant bypass structure according to claim 1, wherein the outlet temperature sensor is linked with the stack bypass valve to control the stack bypass valve.

4. The coolant bypass structure according to claim 3, wherein when an outdoor temperature or a temperature of an air outlet of the stack is equal to or lower than the predetermined value, the outlet temperature sensor sends a control signal to open the stack bypass valve so as to circulate the coolant in the bypass loop.

5. The coolant bypass structure according to claim 3, wherein when a temperature of an air outlet of the stack or the COD heater is higher than the predetermined value, the outlet temperature sensor sends another control signal to close the stack bypass valve so as to circulate the coolant in the main loop.

6. The coolant bypass structure according to claim 5, wherein the coolant circulated in the main loop is introduced into the stack.

7. A fuel cell system, comprising:
   a fuel cell stack disposed at a main loop;
   a bypass loop connected to the main loop and bypassing the fuel cell stack;
   a stack bypass valve guiding coolant to circulate in the main loop or in the bypass loop, the stack bypass valve including an outlet temperature sensor coupled thereto;
   a cathode oxygen depleted (COD) heater disposed at the bypass loop;
   a cooling and heating air conditioner disposed at the bypass loop and connected to the stack bypass valve; and
   a filter disposed at the bypass loop and connected to the cooling and heating air conditioner and to a 4-way valve arranged between the main loop and the bypass loop,
   wherein the stack bypass valve is configured to:
      open the bypass loop and close the main loop in order for the coolant to circulate in the bypass loop and be heated by the COD heater when a temperature acquired by the outlet temperature sensor is lower than or equal to a predetermined value; and
      close the bypass loop and open the main loop in order for the coolant to circulate in the main loop when a temperature acquired by the outlet temperature sensor is higher than the predetermined value.

8. The fuel cell system of claim 7, wherein the stack bypass valve guides the coolant to circulate in the main loop when a temperature detected by the outlet temperature sensor is higher than the predetermined value, and the stack bypass valve guides the coolant to circulate in the bypass loop when the temperature detected by the outlet temperature sensor is equal to or lower than the predetermined value.

* * * * *